United States Patent [19]

Byrd

[11] 4,405,427
[45] Sep. 20, 1983

[54] ELECTRODEPOSITION OF COATINGS ON METALS TO ENHANCE ADHESIVE BONDING

[75] Inventor: Norman R. Byrd, Villa Park, Calif.

[73] Assignee: McDonnell Douglas Corporation, Long Beach, Calif.

[21] Appl. No.: 317,162

[22] Filed: Nov. 25, 1981

[51] Int. Cl.$^3$ .................... C25D 13/06; C25D 13/08
[52] U.S. Cl. ............................................. 204/181 R
[58] Field of Search ...................... 204/181 R, 181 T

[56] References Cited

U.S. PATENT DOCUMENTS 4,136,070  1/1979  Hazan ........................ 204/181 T
4,311,535  1/1982  Yasuhara et al. ............ 204/181 R

FOREIGN PATENT DOCUMENTS 2609577  9/1976  Fed. Rep. of Germany ... 204/181 N

Primary Examiner—Howard S. Williams
Attorney, Agent, or Firm—Max Geldin

[57] ABSTRACT

The invention is directed to the electrodeposition of a coating of a phosphorylated amide on a metal such as aluminum, and the formation of a chemical bond between the metal and the coating, such amide being in the form of (a) an organic polymer consisting of a poly (phosphinohydrazide), a poly (phosphinoguanide) or a poly (phosphinoureide), including homopolymers and copolymers thereof, and their thio analogs or (b) a 2:1 molar adduct of a nitrogen-containing compound such as hydrazine, guanidine or urea or its thio analog, and an organic phosphite or phosphonate. In the method of electrolytically depositing such coating on the metal substrate, e.g., aluminum, the substrate is employed as the anode in a non-aqueous or aqueous electrolyte containing a phosphorylated amide of the type noted above, e.g., poly (phosphinohydrazide), and electrodepositing a coating on the metal substrate, the organic coating formed being chemically bonded to the substrate, thereby enhancing adhesive bonding to the metal substrate, such coating being strongly bonded to the substrate and being corrosion resistant.

33 Claims, No Drawings

ELECTRODEPOSITION OF COATINGS ON METALS TO ENHANCE ADHESIVE BONDING

BACKGROUND OF THE INVENTION

This invention relates to the provision of a coating on a metal substrate such as aluminum to enhance adhesive bonding to such substrate, and is particularly directed to the electrolytic deposition of a coating, particularly an organic coating, on a metal substrate such as aluminum, to form a chemical bond between the coating and the substrate, and providing a film to promote adhesive bonding of the substrate to a structural member e.g., of an aircraft.

Primary adhesive bonding is being considered for an increasing number of aircraft structural joints. Thus, in view of the higher risks involved in the use of bonded primary joints, a need exists for optimum bond strength, long life, and economical and energy conservative processes. Generally, metal surfaces, such as aluminum, may be phosphoric acid oxidized, and this oxide layer becomes involved in adhesive bonding via van der Waals forces and/or hydrogen bonding. However, a stronger bond, such as a chemical bond, is desired to prevent a consequent possibility of reduced adhesive strength and failure due to environmental factors, such as high humidity and temperature.

The adhesion of polymers (as adhesives) to metal substrates is, generally, a complex process. Usually, the metal surface has to be pretreated, and the adhesive has to have sufficient activity for the mating of the two to result in an optimum bond. Substrates, e.g. metals, have to be prepared for this union of such two dissimilar materials as a polymer and a metal by first cleaning and then etching the metal, and, as in the case of aluminum, by anodizing (oxidizing) or other surface treatment such as the so-called FPL etch, employing a solution of sodium dichromate in sulfuric acid. These treatments have the effect of increasing surface area in order to enhance mechanical interaction between the polymer and the metal substrate. However, an important criterion for bonding of the coating to the metal is the wettability of the surface of the metal, and this is related to surface energy. Where mechanical interactions alone between the metal and polymer coating are involved, due primarily to surface roughening, the resulting bond is more likely to be adversely affected by environmental factors such as high temperatures and high humidity.

It is accordingly highly desirable to provide a metal substrate or surface with a coating, and having a strong bond between the coating and the metal, so that upon subsequent application of an adhesive to the coating, the weak link is not the bond between the adhesive and the metal, but rather the weak link would be the adhesive per se. The result would be a higher bond strength between the metal substrate such as aluminum and the part which is adhesively secured to the metal, via the adhesive.

Exemplary of the prior art are the following patents:

U.S. Pat. No. 3,026,255 discloses a method of protecting an oxidized metal surface by dipping the object into a solution of a polymer containing carboxyl, sulfonic or phosphonate groups.

U.S. Pat. No. 3,672,972 discloses a method for improving the adhesive bond between an aluminum surface and other materials, by anodizing the aluminum substrate in an acidic electrolyte.

U.S. Pat. No. 3,790,450 discloses the deposition of an organic coating on a metal substrate, by electrochemically coating a metal substrate as the positive electrode of an electrochemical cell, utilizing a non-aqueous electrolyte comprising a lower aliphatic acid, an aromatic compound and a Group III-A halide. It appears that an ionic polymerization occurs on a platinum anode, requiring a relatively long period of up to about 15 hours to form a polymerized carbonaceous residue.

U.S. Pat. No. 3,734,784 discloses anodic oxidation of an aluminum surface to form an active hydrated amorphous layer of aluminum oxide, followed by treatment of the activated aluminum surface by immersion in an alcohol-water solution of an organic compound containing a functional group such as a carboxyl group which is reactive with the hydrate on the aluminum surface, to form a water-insoluble product at the surface which provides a chemical bond between the overlying organic film and the aluminum substrate.

U.S. Pat. No. 3,990,953 discloses formation of elemental silicon as a corrosion resistant coating, employing a non-aqueous electroplating solution containing a non-aqueous solvent solution of a silicon halide or haloid silane, wherein the silicon compound is decomposed in an electric field to deposit silicon on a cathodic metal surface.

U.S. Pat. No. 4,180,442 discloses electrodeposition of a coating of an organic compound or polymer on a metal such as aluminum and the formation of a chemical bond between the metal and the coating. Organic compounds which can be used for this purpose according to the patent include phenyl phosphonic acid and dimethyl phosphite, as their triethylamine salts.

One object of the present invention is the provision of a coating on a metal surface, such as aluminum, having a strong chemical bond to the metal substrate. Another object is the provision of a procedure for electrolytically depositing a coating on a metal substrate such as aluminum to provide a true chemical bond between the coating and the metal substrate, and permitting the metal substrate to be adhesively bonded to another member. A still further object is the elimination of the anodization process, ordinarily employed in present practice, for adhesively bonding aluminum. Yet another object is the provision of procedure to induce an organic polymer of a specified type to form a coating having a covalent or electrovalent bond with a metal substrate such as aluminum, the polymer having functional groups to provide bondability with adhesives, corrosion resistance and protection against bond degradation by humidity. Another object is the provision of novel compounds particularly adapted for use in the above novel coating procedure.

SUMMARY OF THE INVENTION

The above objects and advantages are achieved according to the invention by electrolytically applying a coating to a metal, e.g. aluminum, surface, employing a non-aqueous or aqueous solution of a phosphorylated amide in the form of (a) an organic polymer consisting of a poly (phosphinohydrazide), a poly (phosphinoguanide) or a poly (phosphinoureide), including homopolymers and copolymers thereof, or (b) a 2:1 molar adduct of two moles of a nitrogen-containing compound of the group consisting of hydrazine, guanidine and urea and its thio analog, to one mole of a phosphorous-containing compound consisting of an organic phosphite such as dimethyl phosphite, or phosphonate such as dimethyl methyl phosphonate and their thio analogs. The polymer or adduct coating has a strong chemical bond to the metal substrate, and also has a functional group or groups capable of covalently bonding the polymer coating to an adhesive. This polymeric or adduct coating, which has functional groups attached for bonding to the metal substrate and to an adhesive, enables a total chemical bond to be formed via such coating between the metal substrate and the adhesive.

Thus, briefly, the present invention provides a process for enhancing adhesive bonding of a metal substrate, which comprises passing an electric current through a non-aqueous or aqueous electrolyte in which a metal substrate is the anode, the metal of said substrate being active and capable of forming an organometallic compound, said electrolyte containing an organic polymer as defined above, having a labile hydrogen, and capable of generating an anion during electrolysis, and a solvent for said polymer, and electrodepositing a coating of said polymer on said metal substrate wherein said anion is reacted with and is chemically bonded to the metal of said substrate.

Examples of polymers used to form an electrodeposited coating on a metal substrate according to the invention, are polymers having the following recurring structural units of the group consisting of (a), (b) and (c) below, and wherein such units are directly connected to each other as in homopolymers, or wherein such units are separated by other groups such as ethylene diamine groups, as in copolymers containing such units; and examples of the 2:1 adducts are represented by the structural formula (d):

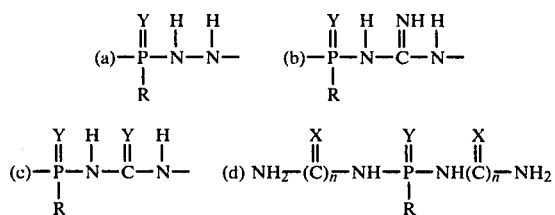

where X is O, S or NH; and R is selected from the group consisting of H, alkyl containing from about 1 to about 6 carbon atoms, e.g. methyl, ethyl, propyl, isopropyl, butyl, isobutyl, tert-butyl, hexyl, pentyl, neopentyl, sec-hexyl; cycloalkyl containing from about 5 to about 7 carbon atoms, e.g., cyclopentyl, cyclohexyl, methylcyclohexyl, cyclopentadienyl, cyclohexenyl, norbornyl; aryl containing from about 6 to about 14 carbon atoms, e.g., phenyl, tolyl, xylyl, biphenyl, naphthyl, anthryl; the corresponding halogenated, e.g. fluorinated, chlorinated or brominated, alkyl and aryl groups, e.g., chloromethyl, dichloromethyl, trichloromethyl, trifluoromethyl, bromoethyl, chlorophenyl, bromophenyl, dibromophenyl, trifluoromethylphenyl, bromonaphthyl, bromoanthryl; nitroaryl containing about 6 to about 14 carbon atoms, e.g., ortho, meta or paranitrophenyl, 1 or 2-nitronaphthyl; hydroxyaryl, e.g. ortho, meta or para hydroxyphenyl, 1 or 2 hydroxnaphthyl, 2,4-dihydroxyphenyl, 9-hydroxyanthryl, 9,10-dihydroxyanthryl; heterocyclic containing 5 to 6 members in the heterocyclic nucleus, and O, N or S as hetero atoms, e.g. pyridyl, furanyl, prrolyl, thienyl, pyrazinyl, pyrimidinyl, pyridazinyl, pyranyl, indolyl, quinolyl, piperidyl, indolinyl, piperazinyl; amino, alkylamino containing from about 1 to about 8 carbon atoms in the alkyl group and cycloalkylamino, e.g. ethylamino diethylamino, cyclohexylamino; arylamino containing from about 6 to about 14 carbon atoms, e.g. phenylamino, 1 or 2-naphthylamino, 9-anthrylamino; and n is 0 or 1; and Y is O or S.

The number of recurrent units in the polymers can vary but can range from 3 to about 20. The end groups of the above polymers are generally $NH_2$ groups. The above polymers and the above adducts generally range from highly viscous liquids to glassy or solid materials.

The above diadducts of formula (d) are novel compounds.

Thus, according to one preferred mode of practice according to the invention, the metal substrate is employed as the anode in a non-aqueous electrolyte which can contain any one or more of the above polymers or adducts. Since the entire surface of the metal forms the anode, the complete surface thereof becomes coated with electrodeposited polymer. Additionally, an electrolytic conversion occurs rather than an electrostatic deposit, that is, a chemical compound or bond is formed by combination of the charged ionic species of metal anode and anion derived from the polymer or adduct, which can be the phosphorus-containing anion, or a nitrogen-containing anion, as in a poly (phosphino hydrazide), forming an electrovalent or covalent bond with the metal anode. Subsequently, this chemically bonded coating or film on the surface of the metal substrate is employed as the surface upon which the adhesive, e.g. an epoxy, will act and form an electrovalent or covalent bond through another functional group on the polymer or adduct, as for example an N-H group on a poly (phosphino hydrazide). Thus, a single chemical treatment of a metal substrate according to the invention results in a treated surface which can be strongly adhesively bonded.

The coating commences to electrodeposit on the metal substrate almost immediately from an aqueous or a non-aqueous, e.g. dimethylformamide (DMF) or ethylene glycol, solution of the polymer, e.g., poly (phosphinohydrazide).

The nature and orientation of the bonding of the organic compound or polymer to the metal, e.g. aluminum surface, was established by Auger electron spectroscopy and multiple internal reflection infrared spectroscopy. The resulting coating on the metal substrate has improved and strong adhesive bondability to the coated metal substrate.

DETAILED DESCRIPTION OF THE INVENTION AND PREFERRED EMBODIMENTS

The metal substrates to be subjected to electrodeposition according to the invention can be oxidized or deoxidized substrates. Thus, the metal substrates can be initially subjected to either a non-deoxidizing cleaning or a deoxidizing cleaning, and either of such cleaning procedures can be utilized for electrodeposition of a polymeric coating according to the invention for enhancing adhesive bonding, particularly by electrodeposition at varying voltages.

An illustrative non-deoxidizing cleaning procedure includes treatment first with Chlorosolve (1,1,1-trichloroethane) a mixture of dichloromethane and isopropyl alcohol, followed by treatment in an alkaline cleaner, and then treatment with hot deionized water, cold water, and then an isopropanol bath, followed by air drying.

An illustrative deoxidizing cleaning procedure includes treatment first with Chlorosolve, followed by treatment in an alkaline cleaner, a deionizing water rinse, and then treatment with a deoxidizer or acid etchant such as Amchem 6-16, which is a proprietary formulation comprised of nitric acid, hydrofluoric acid and chromic acid, followed by rinsing in deionized water and then oven drying.

It will be understood that the above cleaning procedures are optional and form no part of the present invention.

In carrying out the electrodeposition procedure of the invention, the metal of the substrate to be coated should be "active", the term "active metal" being defined herein as an oxidizable metal which can react in the aqueous or non-aqueous medium with the above polymer to form an organometallic compound. The polymer described above is of a type which has a labile hydrogen and can generate an anion. The evidence appears to show that the mechanism of electrodeposition, e.g. of a poly (phosphinohydrazide), is that the anion of the phosphorus-containing polymer, such as the P-H moiety or anion or the N-H moiety or anion, acts on the active metal during electrolysis, and is neutralized by combining with the metal to form an organometallic compound.

Examples of active metals which can be employed as the substrate according to the invention include metals from Group IB, including copper and silver, Group IIB, including for example zinc and cadmium, Groups IIIA and IIIB, including boron, aluminum, scandium and yttrium, Groups IVA and IVB, including lead, tin, silicon, germanium, titanium, and zirconium, Group VA, including antimony and bismuth, VB, such as vanadium, VIB, including chromium, molybdenum, and tungsten, and group VIII, including iron, cobalt and nickel.

Particularly important in connection with aircraft components are the metals aluminum, titanium, stainless steel, nickel, silver and copper.

Any of the phosphorylated amides including the polymers and diadducts described above, and having a labile hydrogen, as defined above, can be used, and which causes the organic anion or moiety to migrate to the anode and deposit as a reaction product with the metal substrate, e.g. aluminum. Specific examples of such phosphorylated amides are those noted below.

TABLE

PHOSPHORYLATED AMIDES (1) 
$$-\overset{O}{\overset{\|}{P}}-\overset{H}{N}-\overset{H}{N}-\overset{O}{\overset{\|}{P}}-\overset{H}{N}-\overset{H}{N}-$$
with H below each P Poly (hydrazylphosphinate)

(2) $H_2N-\overset{H}{N}-\overset{O}{\overset{\|}{P}}-\overset{H}{N}-NH_2$ with H below P Dihydrazylphosphinate (3) $-\overset{O}{\overset{\|}{P}}-\overset{H}{N}-\overset{H}{N}-\overset{O}{\overset{\|}{P}}-\overset{H}{N}-\overset{H}{N}-$ with $CH_3$ below each P Poly (hydrazylmethylphosphonate)

(4) $H_2N-\overset{H}{N}-\overset{O}{\overset{\|}{P}}-\overset{H}{N}-NH_2$ with $CH_3$ below P Dihydrazylmethylphosphonate (5) $-\overset{O}{\overset{\|}{P}}-\overset{H}{N}-CH_2-CH_2-\overset{H}{N}-\overset{O}{\overset{\|}{P}}-\overset{H}{N}-\overset{H}{N}-$ with H below each P Poly (co-ethylenediaminehydrazylphosphinate)

(6) $-\overset{O}{\overset{\|}{P}}-\overset{H}{N}-CH_2-CH_2-\overset{H}{N}-\overset{O}{\overset{\|}{P}}-\overset{H}{N}-\overset{H}{N}-$ with $CH_3$ below each P Poly (co-ethylenediamine hydrazylmethylphosphonate)

(7) $-\overset{O}{\overset{\|}{P}}-\overset{H}{N}-\overset{H}{N}-\overset{O}{\overset{\|}{P}}-\overset{H}{N}-\overset{H}{N}-$ with H below first P and $CH_3$ below second P Poly (co-hydrazylmethylphosphonate-phosphinate)

(8) $-\overset{O}{\overset{\|}{P}}-\overset{H}{N}-CH_2-CH_2-\overset{H}{N}-\overset{O}{\overset{\|}{P}}-\overset{H}{N}-\overset{H}{N}-$ with $CCl_3$ below each P Poly (co-ethylenediamine hydrazyltrichloromethylphosphonate)

(9) $-\overset{O}{\overset{\|}{P}}-\overset{H}{N}-\overset{N}{\overset{\|}{C}}-\overset{H}{N}-\overset{O}{\overset{\|}{P}}-\overset{H}{N}-\overset{NH}{\overset{\|}{C}}-\overset{H}{N}-$ with $CH_3$ below each P Poly (guanidinemethylphosphonate)

TABLE-continued
PHOSPHORYLATED AMIDES

(10) 
$$-\overset{O}{\overset{\|}{P}}-\overset{H}{N}-\overset{O}{\overset{\|}{C}}-\overset{H}{N}-$$
$\quad\quad\;\;|$
$\quad\quad\;\;H$ Poly (ureaphosphinate)

(11)
$$-\overset{O}{\overset{\|}{P}}-\overset{H}{N}-\overset{O}{\overset{\|}{C}}-\overset{H}{N}-\overset{O}{\overset{\|}{C}}-\overset{H}{N}-$$
$\quad\quad\;\;|$
$\quad\quad\;\;H$ Poly (biuretphosphinate)

(12)
$$-\overset{O}{\overset{\|}{P}}-\overset{H}{N}-\overset{O}{\overset{\|}{C}}-\overset{H}{N}-$$
$\quad\quad\;\;|$
$\quad\quad\;\;CH_3$ Poly (ureamethylphosphonate)

(13)
$$-\overset{O}{\overset{\|}{P}}-\overset{H}{N}-\overset{O}{\overset{\|}{C}}-\overset{H}{N}-\overset{O}{\overset{\|}{C}}-\overset{H}{N}-$$
$\quad\quad\;\;|$
$\quad\quad\;\;CH_3$ Poly (biuretmethylphosphonate)

(14)
$$-\overset{O}{\overset{\|}{P}}-\overset{H}{N}-\overset{O}{\overset{\|}{C}}-\overset{H}{N}-\overset{O}{\overset{\|}{P}}-\overset{H}{N}-\overset{O}{\overset{\|}{C}}-\overset{H}{N}-$$
$\quad\quad\;\;|\quad\quad\quad\quad\quad\;\;|$
$\quad\quad\;\;CCl_3\quad\quad\quad\quad\;\;CCl_3$ Poly (ureatrichloromethylphosphonate)

(15)
$$-\overset{O}{\overset{\|}{P}}-\overset{H}{N}-\overset{H}{N}-\overset{O}{\overset{\|}{P}}-\overset{H}{N}-CH_2-CH_2-CH_2-CH_2-CH_2-CH_2-\overset{H}{N}-$$
$\quad\quad\;\;|\quad\quad\quad\quad\;\;|$
$\quad\quad\;\;H\quad\quad\quad\quad\;\;H$ Poly (co-hexamethylenediamine-hydrazylphosphinate)

(16)
$$-\overset{O}{\overset{\|}{P}}-\overset{H}{N}-\overset{NH}{\overset{\|}{C}}-\overset{H}{N}-$$
$\quad\quad\;\;|$
$\quad\quad\;\;H$ Poly (phosphinoguanide)

(17) $H_2N-\overset{O}{\overset{\|}{C}}-\overset{H}{N}-\overset{O}{\overset{\|}{P}}-\overset{H}{N}-\overset{O}{\overset{\|}{C}}-NH_2$
$\quad\quad\quad\quad\quad\quad\quad\;\;|$
$\quad\quad\quad\quad\quad\quad\quad\;\;H$ Diureaphosphinate

(18) $H_2N-\overset{O}{\overset{\|}{C}}-\overset{H}{N}-\overset{O}{\overset{\|}{P}}-\overset{H}{N}-\overset{O}{\overset{\|}{C}}-NH_2$
$\quad\quad\quad\quad\quad\quad\quad\;\;|$
$\quad\quad\quad\quad\quad\quad\quad\;\;CH_3$ Diureamethylphosphonate

(19) $H_2H-\overset{NH}{\overset{\|}{C}}-\overset{H}{N}-\overset{O}{\overset{\|}{P}}-\overset{H}{N}-\overset{NH}{\overset{\|}{C}}-NH_2$
$\quad\quad\quad\quad\quad\quad\quad\;\;|$
$\quad\quad\quad\quad\quad\quad\quad\;\;H$ Diguanidinephosphinate

(20) $H_2N-\overset{NH}{\overset{\|}{C}}-\overset{H}{N}-\overset{O}{\overset{\|}{P}}-\overset{H}{N}-\overset{NH}{\overset{\|}{C}}-NH_2$
$\quad\quad\quad\quad\quad\quad\quad\;\;|$
$\quad\quad\quad\quad\quad\quad\quad\;\;CH_3$ Diguanidinemethylphosphonate The thio analogs of the compounds of the above table are also illustrative specific examples.

The polymers and diadducts can range from viscous to solid materials.

During the electrodeposition, as a result of electrolytic conversion, as previously noted, the metal anode and the anion of the polymer, combine to form a chemical compound which is either electrovalently or covalently bonded. The usefulness of the invention compounds depends on the presence of both the P-H and/or N-H moieties or functional groups in the homopolymers and copolymers and adducts noted above, and having a labile hydrogen. The hydrogen on these moieties is acidic, and it is this feature which allows the polymers, e.g. poly (phosphinohydrazide), and adducts of the invention, to be capable of bonding to a metal substrate, e.g. aluminum, and also interacting and bonding with an epoxy, polyimide, phenolic, polyester, polyacrylate, polyvinyl chloride, and other adhesives, having a suitable functional group such as a carboxyl group or a halogen atom.

Electrolysis is carried out by immersing the metal substrate, according to one embodiment, in a non-aqueous solvent solution of the organic compound or polymer with which the metal substrate is to be coated. Organic solvents for the electrodeposition solutions include, for example, dimethylformamide (DMF), N-methyl pyrollidone, tetrahydrofuran, ethylene glycol, chloroform, and mixtures thereof. The solvent should of course be inert with respect to the organic compound dissolved therein and which is to be coated on the metal substrate. The metal substrate, e.g. aluminum, is made the anode, the cathode being, for example, platinum, or carbon, e.g. graphite. Preferably, triethylamine or an equivalent base or organic amine is added to form a salt with the acidic H on the P-H or N-H moiety of the polymer. This provides an ionized species of the polymer or diadduct, e.g. poly (phosphinohydrazide), which allows such polymeric anion to migrate to the anode, and the amine salt connected to the hydrogen, e.g. triethylamine ion, migrates to the cathode and gives up $H_2$ gas. Either direct current or alternating current can be employed in the electrodeposition, preferably direct current. Electrolytic voltages employed can range from about 1 to as high as 300 volts, usually from about 1.5 to about 100 volts, optimally about 15 to about 50 volts. Increasing the voltage substantially above 100 volts generally decreases adhesive bonding strength. Electrodeposition of the coating on the metal substrate takes place very rapidly, generally in not more than about 5 minutes, usually within about 1 minute. After that time, current drops off markedly, indicating electrodeposition of the coating on the metal substrate.

In carrying out the electrodeposition according to the invention, it is preferred that the electrodeposition reaction be carried out in non-aqueous media. The electrodeposition also can be carried out in an aqueous medium. However, in water, there is a tendency for the competing reaction of anodization to occur, rather than for the deposition of a strong chemically bonded coating on the metal substrate, which occurs in non-aqueous solutions according to the invention, and which confers enhanced bonding characteristics on the substrate.

Coating thicknesses of the electrodeposited coating according to the invention can range, e.g. from about 0.02 micron to about 100 microns.

The chemically bonded coating formed on the metal substrate according to the invention, has functional groups attached thereto for bonding to an adhesive, such as an additional N-H group, in the case of poly (hydrazyl phosphinate), noted above. Adhesives which can be strongly bonded to metal substrates such as aluminum, via the electrodeposited coating according to the invention, include epoxy, polyimides, phenolics, and other adhesives set forth above.

The following are examples of practice of the invention:

EXAMPLE I

Into a one liter resin flask, cooled with a dry ice/ethylene glycol bath, was placed 50.1 g (1 mole) of hydrazine hydrate. To the cold solution there was slowly added, by dropwise addition, 110.2 g (1 mole) of dimethylphosphite. Addition was continued slowly over a period of one hour, while the solution was stirred very vigorously. After the addition was complete the mixture was allowed to come to room temperature, at which point it began to exotherm to 60° C. It was cooled again with a dry ice bath and left overnight. The next day, the solution was warmed to room temperature and then heated to reflux. Methyl alcohol and water were removed as an azeotrope, then the temperature gradually rose to 120° C., during which time the remainder of the water and a small amount of hydrazine was removed. At this point, the reaction was stopped to yield a very viscous product whose structure is that shown by Compound 1 in the Table. It was characterized by infrared spectroscopy, and it showed the presence of the -PH group at 4.2 microns and a broad bonded NH absorption band from about 2.05 to 3.25 microns. The compound was also characterized by nuclear magnetic resonance (NMR) spectrosopy to also show the presence of the PH and NH moieties.

EXAMPLE II

Utilization of the phosphorylated amides prepared according to the present invention, and their effect on the mechanical strength of the adhesive bond can be shown by electrodeposition of the poly (phosphinohydrazide) prepared in Example I. First, the metal was prepared for the electrodeposition process, and then the electrodeposited coating on the metal substrate was adhesively bonded and finally a lap shear test was performed.

Various metal substrates such as aluminum, titanium and stainless steel were initially subjected to the usual pretreatment given to each metal. Thus, the aluminum was first cleaned in a chlorinated solvent, such as 1,1,1 trichloroethane, to remove surface oils and grease, followed by treatment in the standard alkaline cleaner called Turco 4125S, made by Turco Products, Inc., Carson, CA for 10 to 15 minutes at 145 to 155° F. This was followed by a spray rinse with clean tap water (around 100° F.) for two minutes, and the metal was then immersed and rinsed in overflowing tap water (100° to 145° F.) for 5 minutes. The next step consisted of immersing the aluminum in Amchem 6-16 (Amchem Products, Inc., Ambler, PA) for 10 to 15 minutes at room temperature. This is a deoxidizing step and it removes the normal oxides on the metal leaving it in a condition ready for anodization. The metal was removed from the deoxidizer, immersed in overflowing tap water (65° to 110° F.) for two minutes followed by a spray rinse with deionized water. At this point, the metal was treated by the electrodeposition process hereof.

The electrodeposition of the various phosphorylated amides was done in both aqueous and non-aqueous solutions, the non-aqueous being the preferred solution. The concentration of amide additive or product in solution varied from 0.1 mole to 0.75 mole of amide dissolved in 400 ml of solvent, e.g. ethylene glycol for the non-aqueous solution. The number of moles of amide product was obtained in the case of the polymers from the molecular weight of the recurring unit in the polymer, as, for example,

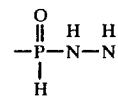

being 78.

In practice, the requisite number of moles of product were dissolved in 400 mls of ethylene glycol, and then the equivalent number of moles of triethylamine were added. This was now the electrodepositing solution. Thus, for 0.25 mole of product in solution, 19.5 g of the above poly (phosphinohydrazide) (compound 1) were dissolved in 400 mls of ethylene glycol, and to this solution was added 25.2 g of triethylamine. This solution was used for the electrodepositions.

The electrodeposition process consisted of putting 40 mls of stock solution into a 50 ml beaker in which there were two ⅜″ wide by 2″ long platinum electrodes on opposite sides of the beaker. These electrodes were connected by a copper wire such that they were at equipotential and were the cathode. Into this beaker there was immersed a 1″×4″ metal strip which was the anode. This anode was centered exactly between the platinum electrodes, and to a depth of one inch into the solution so that the surface being treated was one square inch. The metals used were as mentioned above, either aluminum, such as, for example, 2024T3 clad aluminum, or titanium, such as Ti6Al-4V alloy, or stainless steel, such as 301 or 316.

The electrodepositions were performed using direct current at various voltages from as low as 1.5 volts to as high as 300 volts until the current dropped to a minimal value. The optimum voltage range is from around 15 volts to 50 volts. Both platinum and graphite (carbon) electrodes were used with equal success. Subsequent to the electrodeposition, the metal was washed in an ethylene glycol bath, then with water and finally methanol to remove any unreacted compounds. After the washing, the metal was air dried and bonded with an epoxy adhesive tape (FM73) for lap shear testing. Coatings were formed on all of the electrodeposited samples.

The aqueous systems used were made up by weighing out 0.1 moles of phosphorylated amide and dissolving it in 100 ml water, instead of ethylene glycol. This was treated with 0.1 mole, of triethylamine and the electrodeposition voltages ranged from 1.5 to 100 volts, maximum. Evidence obtained by means of scanning electron microscopy, X-ray microprobe, infrared spectroscopy, chemical analysis, X-ray fluorescence spectroscopic analysis and Auger spectroscopy showed that the phosphorus atom was found on the substrate, such as the aluminum surface, after electrodeposition and also aluminum was found in the phosphinohydrazide polymer which was flaked off from some of the loosely adhering coating on the aluminum surface, proving that the phosphinohydrazide polymer had formed a chemical bond to the aluminum. Thus, the poly (phosphinohydrazide) can bond to the aluminum either through the phosphorus atom or through the nitrogen atom. In addition, if bonded to the aluminum through either of these atoms, the polymer can still chemically bond an epoxy adhesive through the second nitrogen of the hydrazide.

Strips of 2024-T3 clad aluminum of the same dimensions noted above and which were subjected to normal phosphoric acid anodizing, and also strips of 2024-T3 clad aluminum which were only cleaned and acid-etched (no further treatment) as described above, were used as controls in adhesion tests with the hydrazide polymer coated strips noted above. The control strips and the strips having an electrodeposited coating according to the invention, were bonded with FM73 (epoxy tape) adhesive and cured in an autoclave at 40 psi and 240° F. for 90 minutes. In these tests, pairs of strips coated with the hydrazide polymer (compound 1) as noted above, were adhesively bonded together, with the electrodeposited coatings thereon being between the metal substrate and the adhesive. Pairs of control strips were similarly adhesively bonded together. The cured adhesively connected pairs of strips were then subjected to single lap shear tests.

The phosphoric acid anodized control strips showed bonded lap shear values of about 4500 psi to about 5,500 psi, the aluminum controls that were only acid etched gave lap shear values of only about 1,000 psi, and the lap shear values for the aluminum strips coated in electrodeposition in non-aqueous medium, with poly (phosphinohydrazide) of Example 1 according to the invention were in the range between 4,500 psi and 5,300 psi, comparable to values obtained for the phosphoric acid anodized strips, and showing strong bonding of the electrodeposited polymer to the aluminum strips and the epoxy adhesive. When coated from the aqueous medium, the lap shear values were about 3,800 to 4,000 psi.

EXAMPLE III

It is possible to react dimethylphosphite with hydrazine in solvent systems, as well as in bulk (no solvent). This Example (corresponding to the reaction given in Example 1) demonstrates the reaction conditions of the solvent system. To 330.15 g (3 moles) of dimethylphosphite, dissolved in 300 mls of methanol, and cooled in a dry ice/ethylene glycol bath, were rapidly added, and with vigorous stirring, 151.36 g (3 moles) of hydrazine hydrate. The solution was then refluxed for 5.5 hours at 69° C., at the end of which time the methanol was distilled off. After the bulk of the methanol was removed, 300 mls of xylene were added and the solution refluxed at 80° C. for 4.5 hours. At the end of this time, liquid fractions were distilled off from 80° C. to as high as 132° C. When the bulk of the xylene had been distilled off, the solution was cooled to yield a cloudy, viscous solution weighing in excess of the theoretical 234 g. It was presumed that the cloudiness and excess weight might be attributable to trapped xylene that could not be easily removed.

Thus, although the solvent reaction method required fewer precautions than the bulk reaction method of Example I, it appeared to yield a product somewhat contaminated with xylene. However, they both had the same characteristic absorption peaks in the infrared spectrum for the expected product (compound 1).

EXAMPLE IV

This example demonstrates the reaction conditions for the preparation of the 2:1 molar product adduct from hydrazine and dimethylphosphite.

To 100.1 g (2 moles) of hydrazine monohydrate, in a one liter resin flask, and cooled with a dry ice/ethylene glycol bath, was added, dropwise and with stirring, 110.1 g (1 mole) of dimethylphosphite. When the addition was complete, the entire mixture was left cooled in the dry ice/ethylene glycol bath for about 16 hours. It was warmed up to room temperature and then refluxed at 64° C. for two hours. At the end of that time, the alcohol and water were removed until the vapor temperature reached 120° C. At this time, the reaction was stopped. This is compound 2 of the Table above.

EXAMPLE V

Into a one liter flask there was added 50.1 g (1 mole) of hydrazine hydrate, cooled with a dry ice/ethylene glycol bath. To this cold solution, and with stirring, there was slowly added 124 g (1 mole) of dimethylmethylphosphonate over a period of one hour. When the addition was complete, the solution was left in the dry ice bath overnight. It was subsequently heated to reflux, and alcohol and water removed. When the reflux temperature went to 119° C., the reaction was stopped. The product was a clear, viscous material in high yield whose structure is represented as compound 3 in the Table.

Strips of 2024T3 clad aluminum were coated with the above polymer by the non-aqueous electrodeposition procedure of Example II; and lap shear tests of the resulting coated strips carried out as described in Example II, resulted in lap shear values for such strips of about 4,980 psi, indicating strong bonding of the hydrazide coating to both the aluminum strips and to the epoxy adhesive.

EXAMPLE VI

The preparation of the 2:1 molar hydrazine to dimethyl methylphosphonate product follows the same reaction procedure used in the preparation of compound 2, as shown in Example IV, except that dimethyl methylphosphonate was used in place of dimethylphosphite. The product is compound 4 in the Table.

EXAMPLE VII

The preparation of compound 15 in the Table, which is a copolymer of dimethylphosphite, hydrazine and hexamethylene diamine was effected in the following manner: One mole of dimethylphosphite was added, dropwise and with stirring, to a mixture of 0.5 mole hydrazine hydrate and 0.5 mole hexamethylene diamine in a one liter resin flask and cooled in a dry ice/ethylene glycol bath. After being kept cold in the dry ice bath overnight, the reaction was brought to reflux for about two hours and then the alcohol and water were distilled off. When the temperature reached 120° C., the distillation was stopped and a very viscous product resulted. Strips of 2024T3 clad aluminum were coated with the above polymer by the aqueous electrodeposition procedure of Example II; and lap shear tests of the resulting coated strips carried out as described in Example II resulted in lap shear values for such strips of about 3800 psi.

EXAMPLE VIII

The copolymer, compound 7 in the Table, was prepared in similar fashion to compound 1 (Example I) except that 0.5 mole of dimethylphosphite and 0.5 mole of dimethyl methylphosphonate were added to one mole of hydrazine hydrate. The reaction conditions and workup were exactly the same as the homopolymer given in Example I.

EXAMPLE IX

Guanidine hydrochloride (1 mole) was suspended in 500 mls of bromobenzene, and one mole of dimethylphosphite was added. The mixture was heated to reflux at 152° C. and refluxed for 20 hours. The solvent was distilled off, and a solid product was left whose NMR analysis showed the presence of all the expected groups of the phosphinoguanide polymer. This is compound 16 in the Table.

EXAMPLE X

The preparation of compound 9 in the Table is identical in procedure to the preparation of compound 16 (from Example IX) except that dimethylmethylphosphonate was used in place of dimethylphosphite, and o-dichlorobenzene was used as a solvent in place of bromobenzene.

Electrodeposition of such polymer, compound 9, on coated aluminum strips by the non-aqueous procedure described in Example II above, and bonding of such coated strips with an epoxy adhesive, resulted in lap shear values of the coated strips comparable to those of the polymer coated strips of Example II.

EXAMPLE XI

One mole of dimethyl methylphosphonate and one mole of urea were mixed in 130 mls of xylene. The reaction mixture was heated to 130° C. for 48 hours and the xylene decanted off to leave behind an extremely viscous polymer, poly (urea methyl phosphonate), having the structure shown at 12 in the Table, above.

Electrodeposition of such polymer on aluminum strips by the procedure described in Example II, and bonding of such coated strips with an epoxy adhesive, resulted in lap shear values of the coated strips comparable to those of the polymer coated strips of Example II.

EXAMPLE XII

The procedure of Example XI is repeated but employing one mole of dimethylphosphite and one mole of urea to obtain a polymer, poly (urea phosphinate) having the structure 10 in the Table, above.

Electrodeposition of such polymer on coated aluminum strips by the procedure described in Example II, and bonding of such coated strips with an epoxy adhesive, resulted in lap shear values of the coated strips comparable to those of the polymer coated strips of Example II.

EXAMPLE XIII

The preparation of the 2:1 molar urea to dimethylphosphite adduct or product consisted of adding two moles of urea to one mole of dimethylphosphite in 500 mls of methanol, and heating to reflux for 24 hours. The methanol was distilled off and 300 mls of xylene were added. The heating at reflux continued for six hours, and then the xylene was distilled off. The product is compound 17 in the Table.

EXAMPLE XIV

The preparation of the 2:1 molar urea to dimethylmethylphosphonate product followed the same procedure given in Example XIII except that dimethyl methylphosphonate was used in place of dimethylphosphite of Example XIII. This product is compound 18 in the Table.

EXAMPLE XV

The preparation of the 2:1 molar guanidine to dimethylphosphite product consisted of putting two moles of guanidine hydrochloride and one mole of dimethylphosphite into a one liter resin flask with 500 mls of bromobenzene and heating to reflux for 24 hours. The solvent was distilled off and a solid product was obtained that is compound 19 in the Table.

EXAMPLE XVI

The preparation of the 2:1 molar guanidine to dimethylmethylphosphonate product follows the same procedure as was used for the 2:1 guanidine to dimethylphosphite product, as shown in Example XV, except that one mole of dimethyl methylphosphonate was used in place of one mole of dimethylphosphite of Example XV. This product is compound 20 in the Table.

The examples above show that the polymers and diadducts of the invention can be electrodeposited on metal e.g. aluminum, substrates according to the invention process, to function as a chemically bonded intermediate layer between such metal substrates and an adhesive to form a continuum from the metal to the adhesive.

Further, strips containing the electrodeposited coating according to the invention can be stored for long periods and such strips are protected from corrosion and oxidation by the coating, whereas conventional uncoated strips cannot be stored because of surface oxidation.

From the foregoing, it is seen that the invention provides procedure for applying an organic polymeric or diadduct coating to a metal substrate such as aluminum, for producing a system or combination which enhances adhesive bonding of such metal substrate. Thus, the present invention reduces and/or eliminates present manufacturing procedures required for making an adhesive bondable metal surface. Another advantage of the present invention is the production of a metal part or substrate having a chemically bonded organic polymeric coating, and which can be stored for indefinite periods of time, without concern as to whether it becomes oxidized. When such coated part is needed, it can be removed from the shelf, and with no further treatment, can be used for adhesive bonding.

While I have described particular embodiments of my invention for purposes of illustration, it will be understood that various changes and modifications within the spirit of the invention can be made and the invention is not to be taken as limited except by the scope of the appended claims.

What is claimed is:

1. A process for enhancing adhesive bonding of a metal substrate, which comprises passing an electric current through a non aqueous or aqueous electrolyte in which a metal substrate is the anode, the metal of said substrate being active and capable of forming an organometallic compound, said electrolyte containing a phosphorylated amide having a labile hydrogen, and capable of generating an anion during electrolysis, said phosphorylated amide being in the form of (a) an organic polymer consisting of a poly (phosphinohydrazide), a poly (phosphinoguanide) or a poly (phosphinoureide), including homopolymers and copolymers thereof, and their thio analogs, or (b) a 2:1 molar adduct of two moles of a nitrogen-containing compound of the group consisting of hydrazine, guanidine and urea, and its thio analog, to one mole of and organic phosphite or phosphonate, and their thio analogs, and electrodepositing a coating of said amide on said metal substrate wherein said anion is reacted with and is chemically bonded to the metal of said substrate.

2. The process as defined in claim 1, wherein said electrolyte is a non-aqueous electrolyte containing an inert organic solvent for said polymer.

3. The process as defined in claim 2, wherein said electrolyte contains a base capable of forming a salt with the P-H or N-H moiety of said polymer.

4. The process as defined in claim 2, wherein said organic solvent is selected from the group consisting of dimethylformamide, N-methyl pyrrolidone, tetrahydrofuran, ethylene glycol, and mixtures thereof.

5. The process as defined in claim 2, wherein said substrate is selected from the group consisting of aluminum, titanium, stainless steel, nickel, silver and copper, and said organic solvent is selected from the group consisting of dimethylformamide, N-methyl pyrrolidone, tetrahydrofuran, ethylene glycol, and mixtures thereof.

6. The process as defined in claim 5, wherein said current is direct current, said voltage ranging from about 15 to about 50 volts, and wherein said electrodeposition is carried out for a period up to more than about 5 minutes.

7. The process as defined in claim 6, wherein said substrate is aluminum.

8. The process as defined in claim 1, wherein said electrolyte is an aqueous electrolyte.

9. The process as defined in claim 8, wherein said base is an organic amine.

10. The process as defined in claim 1, wherein said organic polymer has a recurring structural unit having the formula (a), (b) or (c) below, and said adduct has the formula (d) noted below

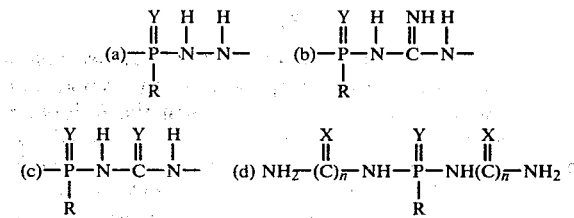

where X is O, S or NH; Y is O or S; and R is selected from the group consisting of H, alkyl containing from about 1 to about 6 carbon atoms, cycloalkyl containing from about 5 to about 7 carbon atoms, aryl containing from about 6 to about 14 carbon atoms, the corresponding halogenated alkyl and aryl groups, nitroaryl containing about 6 to about 14 carbon atoms, heterocyclic containing 5 to 6 members in the heterocyclic nucleus, and O, N or S as hetero atoms, amino, alkylamino containing from about 1 to about 8 carbon atoms in the alkyl group, arylamino containing from about 6 to about 14 carbon atoms, and n is 0 or 1.

11. The process as defined in claim 10, wherein said phosphorylated amide is a homopolymer or copolymer having the recurring structural unit (a), (b), or (c), and wherein the number of recurrent units in said homopolymers and copolymers can range from 3 to about 20, and the end groups of such homopolymers or copolymers are generally NH$_2$ groups.

12. The process as defined in claim 10, wherein said phosphorylated amide is a 2:1 molar adduct having the formula (d).

13. The process as defined in claim 10, wherein said phosphorylated amide is a poly (phosphinohydrazide) having the recurring structural unit (a), wherein Y is 0.

14. The process as defined in claim 10, wherein said phosphorylated amide is a poly (phosphinoguanide) having the recurring structural unit (b), wherein Y is 0.

15. The process as defined in claim 10, wherein said phosphorylated amide is a poly (phosphinoureide) having the recurring structural unit (c), wherein Y is 0.

16. The process as defined in claim 10, wherein said amide is poly (hydrazyl phosphinate).

17. A metal substrate containing an organic electrodeposited coating which is chemically bonded to said substrate to enhance adhesive bonding, produced by the process of claim 16.

18. The process as defined in claim 10, wherein said amide is dihydrazyl phosphinate.

19. The process as defined in claim 10, wherein said amide is poly (hydrazyl methyl phosphonate).

20. A metal substrate containing an organic electrodeposited coating which is chemically bonded to said substrate to enhance adhesive bonding, produced by the process of claim 19.

21. The process as defined in claim 10, wherein said amide is dihydrazylmethylphosphonate.

22. The process as defined in claim 10, wherein said amide is poly (co-hexamethylenediamine-hydrazylphosphinate).

23. The process as defined in claim 10, wherein said amide is poly (co-ethylenediamine hydrazylmethylphosphonate).

24. The process as defined in claim 10, wherein said amide is poly (urea phosphinate).

25. A metal substrate containing an organic electrodeposited coating which is chemically bonded to said substrate to enhance adhesive bonding, produced by the process of claim 10.

26. The process as defined in claim 1, wherein said substrate is selected from the group consisting of aluminum, titanium, stainless steel, nickel, silver and copper.

27. The process as defined in claim 26, wherein said electrodeposition is carried out at voltage ranging from about 1.5 to about 100 volts.

28. The process as defined in claim 1, wherein said current is direct current or alternating current.

29. The process as defined in claim 1, wherein said electrodeposition is carried out at voltage ranging from about 1 to about 300 volts.

30. The process as defined in claim 29, wherein said electrodeposition is carried out for a period up to not more than about 5 minutes, until the current drops to a minimal value.

31. The process as defined in claim 1, including applying an organic adhesive to said electrodeposited coating on said substrate.

32. The process as defined in claim 31, wherein said adhesive is an epoxy adhesive.

33. A metal substrate containing an organic electrodeposited coating which is chemically bonded to said substrate to enhance adhesive bonding, produced by the process of claim 1.

* * * * *

UNITED STATES PATENT AND TRADEMARK OFFICE
CERTIFICATE OF CORRECTION

PATENT NO. : 4,405,427

DATED : 20 September 1983

INVENTOR(S) : Norman R. Byrd

It is certified that error appears in the above—identified patent and that said Letters Patent is hereby corrected as shown below:

```
Front page, left column, Code [22], the date
"Nov. 25, 1981" should be changed to
--Nov. 2, 1981--.

Column 15, line 47, (Claim 1) the word "and"
should be --an--.

Column 16, line 4, (Claim 6) the word --not--
should be inserted after the word "to".
```

Signed and Sealed this

Tenth Day of November, 1987

Attest:

DONALD J. QUIGG

Attesting Officer

Commissioner of Patents and Trademarks